United States Patent
Kami et al.

(10) Patent No.: US 6,782,914 B2
(45) Date of Patent: Aug. 31, 2004

(54) GASEOUS FUEL DISCHARGING STRUCTURE FOR VEHICLE

(75) Inventors: Yozo Kami, Wako (JP); Tohru Ono, Wako (JP); Yoshihiro Shimizu, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 291 days.

(21) Appl. No.: 10/028,330

(22) Filed: Dec. 28, 2001

(65) Prior Publication Data

US 2002/0092562 A1 Jul. 18, 2002

(30) Foreign Application Priority Data

Jan. 16, 2001 (JP) ........................................ 2001-008313

(51) Int. Cl.[7] ............................ F16K 24/00; B60H 1/26
(52) U.S. Cl. ...................... 137/312; 123/516; 137/351; 137/587; 141/86; 141/98; 141/311 A; 220/86.2; 220/746; 280/834; 454/75; 454/141
(58) Field of Search ................................ 137/312, 351, 137/587; 123/516, 517, 518, 519, 527; 141/86, 95, 98, 198, 311 A; 220/86.2, 746; 222/108; 280/834; 454/75, 78, 141

(56) References Cited

U.S. PATENT DOCUMENTS

| | | | | |
|---|---|---|---|---|
| 877,655 A | * | 1/1908 | Low ............................ | 454/78 |
| 2,356,391 A | * | 8/1944 | Flour .......................... | 454/78 |
| 2,877,701 A | * | 3/1959 | Whitaker ...................... | 454/78 |
| 3,465,665 A | * | 9/1969 | O'Day et al. .................. | 454/78 |
| 4,108,238 A | * | 8/1978 | Vary et al. ..................... | 165/57 |
| 4,283,067 A | * | 8/1981 | Weber et al. ............... | 280/834 |
| 4,804,140 A | * | 2/1989 | Cantrell ....................... | 454/141 |
| 5,040,455 A | * | 8/1991 | Doi et al. ..................... | 454/75 |
| 5,050,520 A | * | 9/1991 | Ballard ........................ | 454/78 |
| 5,132,663 A | * | 7/1992 | Strobl et al. .................. | 454/75 |
| 5,205,781 A | * | 4/1993 | Kanno et al. ............... | 454/164 |
| 5,701,928 A | * | 12/1997 | Aoki .......................... | 137/312 |
| 6,220,383 B1 | * | 4/2001 | Muraki et al. ............. | 180/68.5 |

FOREIGN PATENT DOCUMENTS

JP          8-99544        4/1996

* cited by examiner

Primary Examiner—George L. Walton
(74) Attorney, Agent, or Firm—Arent Fox PLLC

(57) ABSTRACT

A gaseous fuel discharge structure is used in a vehicle including an airtight cover disposed within a trunk thereof. The airtight cover covers a gaseous fuel containing tank. The structure includes an air introducing pipe and a gas discharging pipe both connected to the cover. If gaseous fuel leaks from within the tank, the structure is operated to discharge the gaseous fuel out of the vehicle. The air introducing pipe is provided with a fan. The air introducing pipe has an air intake flap while the gas discharging pipe has a discharge flap.

3 Claims, 8 Drawing Sheets

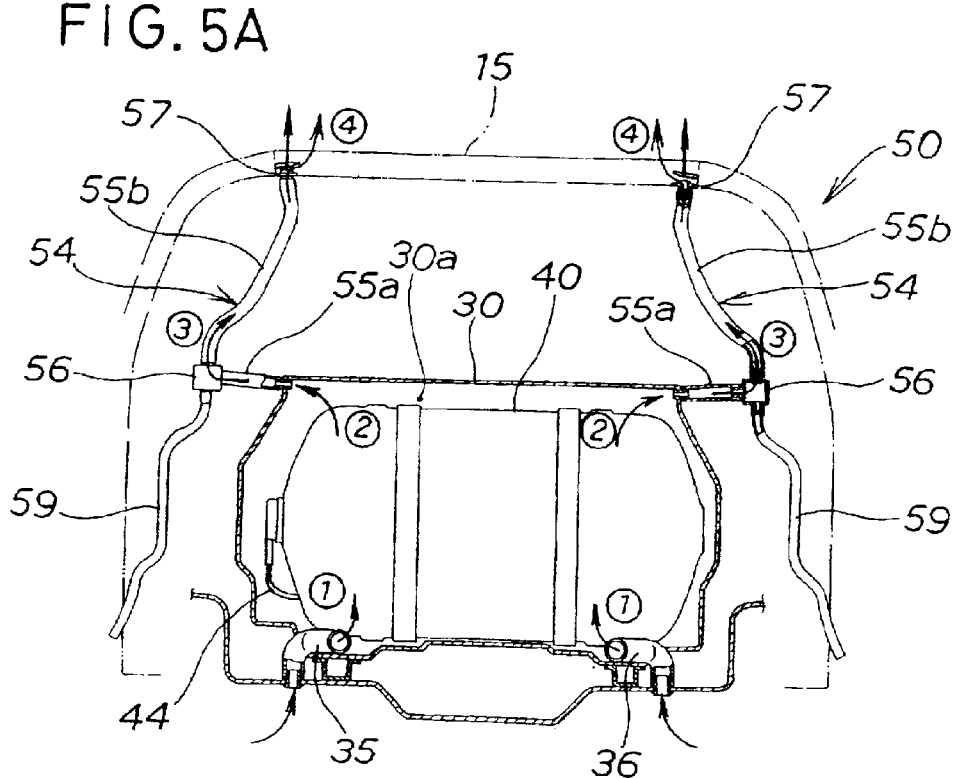
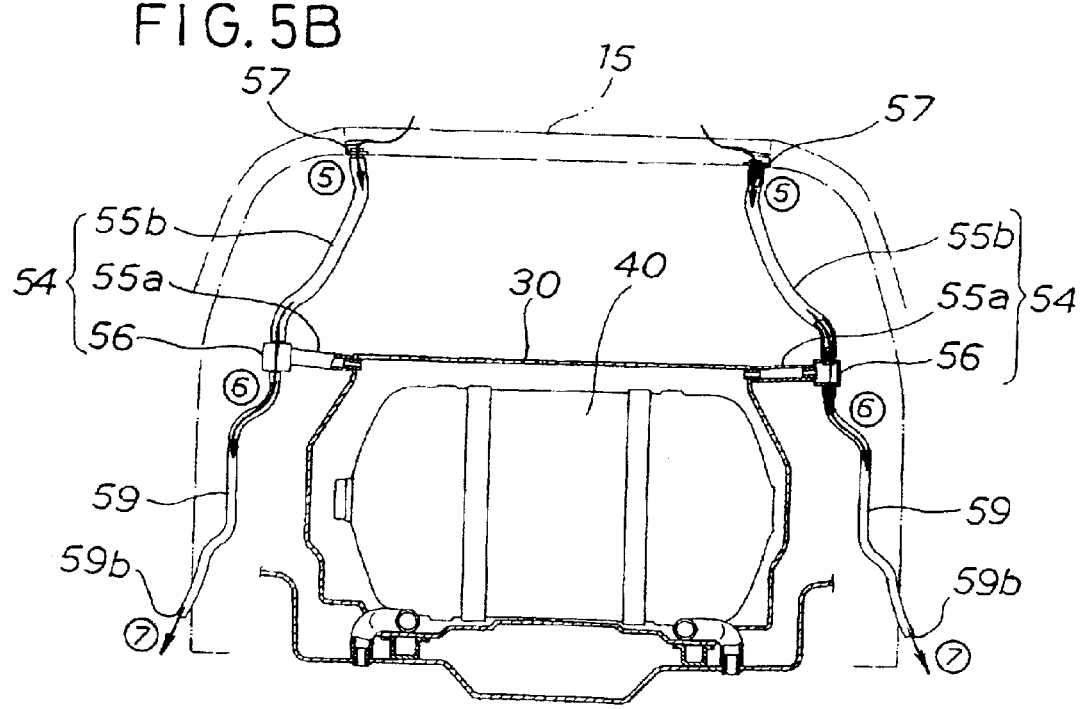

GASEOUS FUEL DISCHARGING STRUCTURE FOR VEHICLE

FIELD OF THE INVENTION

The present invention relates to a gaseous fuel discharging structure for use with a gaseous fuel containing tank disposed within a trunk of a vehicle, and in particular to the structure which, if gaseous fuel unfortunately leaks from within the tank, directs such gaseous fuel out of the trunk.

BACKGROUND OF THE INVENTION

Gaseous fuel discharging structures for vehicles are well known in the art. One example of such structures is known from Japanese Patent Laid-Open Publication No. HEI-8-99544 entitled "STRUCTURE FOR AUTOMOBILE HAVING MOUNTED THERETO END OF PIPE FOR DISCHARGING LEAKAGE COMPRESSED GASEOUS FUEL". The publication discloses an automobile having gaseous fuel containing tanks mounted within a trunk thereof. The tanks are connected to plural exits of a gas supply pipe. The gas supply pipes have one entrance provided in fluid communication with a filler formed in a recess positioned at a rear side wall portion of an automobile body.

The recess is covered with a cover. With the cover opened, the tanks can be filled with gaseous fuel supplied from the gas supply pipe.

The recess also has formed therein an opening which is in fluid communication with one discharge port of a gas discharge pipe. The gas discharge pipe has plural intake ports each connected to a junction at which each exit of the gas supply pipe is connected to the tank. Even if gaseous fuel undesirably leaks from within the tanks, such leaked gas flows into the intake ports of the gas discharge pipe out of the discharge port.

Since the recess is formed at the rear wall portion of the automobile body, the former is small in size to provide pleasant appearance of the automobile. This requires the gas supply pipe to have a limited diameter.

For the gas discharging structure disclosed in the publication, gaseous fuel leaked from within the tanks spontaneously flows through the gas discharge pipe out of the automobile body. In other words, such leaked gaseous fuel is slowly discharged into the open air. What has been needed is a structure for advantageously discharging the gaseous fuel into the open air.

Fuel-cell-powered automobiles typically employ hydrogen gas as gaseous fuel. For resinous tanks holding such hydrogen gas therein, the hydrogen gas could undesirably pass through the tank.

Especially for the fuel-cell-powered automobiles, therefore, there is required a structure for advantageously discharging into the open air the hydrogen gas leaked the tanks.

SUMMARY OF THE INVENTION

An object of the present invention is to provide a gaseous fuel discharging structure for a vehicle, which rapidly discharges gaseous fuel, leaked from within a fuel tank, into the air.

According to an aspect of the present invention, there is provided a gaseous fuel discharging structure for a vehicle having a trunk and a gaseous fuel containing tank disposed in a hermetic space defined within the trunk, which gaseous fuel discharging structure comprises: an air introducing pipe communicating with the hermetic space and extending to outside of the vehicle; a gas discharging pipe communicating with the hermetic space and extending to the outside of the vehicle; forced ventilation means disposed on at least one of the air introducing pipe and the gas discharging pipe for forcedly ventilating the hermetic space; and an opening/closing device disposed on each of the air introducing pipe and the gas discharging pipe, the opening/closing devices being held at a closed position to seal the air introducing pipe and the gas discharging pipe when the forced ventilation means is out of operation and, when the forced ventilation means is in operation, pivoted to an opened position so that any gaseous fuel leaked from the gaseous fuel containing tank into the hermetic space is forced out of the vehicle through the gas discharging pipe by fresh air flowing through the air introducing pipe into the hermetic space.

At least one of the air introducing pipe and the gas discharging pipe has a forced ventilating device. Each of the air introducing pipe and the gas discharging pipe includes the opening/closing device. Operation of the forced ventilating device causes the opening/closing device of the air introducing pipe to be opened so that air outside the vehicle is drawn through the air introducing pipe into the cover. Such air is discharged out of the gas discharging pipe along with the gaseous fuel leaked from the tank.

By thus driving the forced ventilating device in such a manner that the air outside the vehicle is forcibly taken into the cover, the gaseous fuel which remains within the cover after leaked from within the tank is rapidly discharged out of the vehicle along with the air. Accordingly, it becomes possible to efficiently ventilate a space formed within the cover.

As the forced ventilating device is out of operation, the opening/closing devices are held in the closed positions. Since these opening/closing devices normally close the air introducing pipe and the gas discharging pipe, noise is no longer transmitted through these pipes into a passenger compartment of the vehicle. Moreover, unwanted foreign materials such as water and dust are prevented from entering into the air introducing pipe and the gas discharging pipe.

In a preferred form of the present invention, the hermetic space is defined by a sealing cover hermetically enclosing the gaseous fuel containing tank, and the air introducing pipe and the gas discharging pipe extend outwardly of the vehicle from the sealing cover. The forced ventilation means may comprise a fan to be actuated upon leakage of the gaseous fuel. The opening/closing devices may comprise flaps to be pivoted to the opened position by the flow of air produced by the fan.

Desirably, the gas discharging structure further comprises a floor plate provided for carrying an entrance of the air introducing pipe and an exit of the gas discharging pipe thereon. The floor plate may have right and left side frames mounted thereon. One of the entrance and the exit may be positioned outwardly of the left side frame while the other of the entrance and the exit may be positioned outwardly of the right side frame.

The entrance of the air introducing pipe and the exit of the gas discharging pipe are provided at the floor plate. These pipes are difficult to view from outside the vehicle.

One of the air introducing pipe and the gas discharging pipe is provided externally of the left side frame while the other is provided externally of the right side frame. This arrangement has the advantage that the mixture discharged out of exit of the gas discharging pipe is not drawn into the entrance of the air introducing pipe.

BRIEF DESCRIPTION OF THE DRAWINGS

A certain preferred embodiment of the present invention will hereinafter be described in detail, by way of example only, with reference to the accompanying drawings, in which:

FIGS. 5A and 5B are views illustrating how a spontaneous ventilation structure is operated when gaseous fuel leaks from within a gaseous fuel containing tank;

DETAILED DESCRIPTION OF THE PREFERRED EMBODIMENTS

Figure 1:
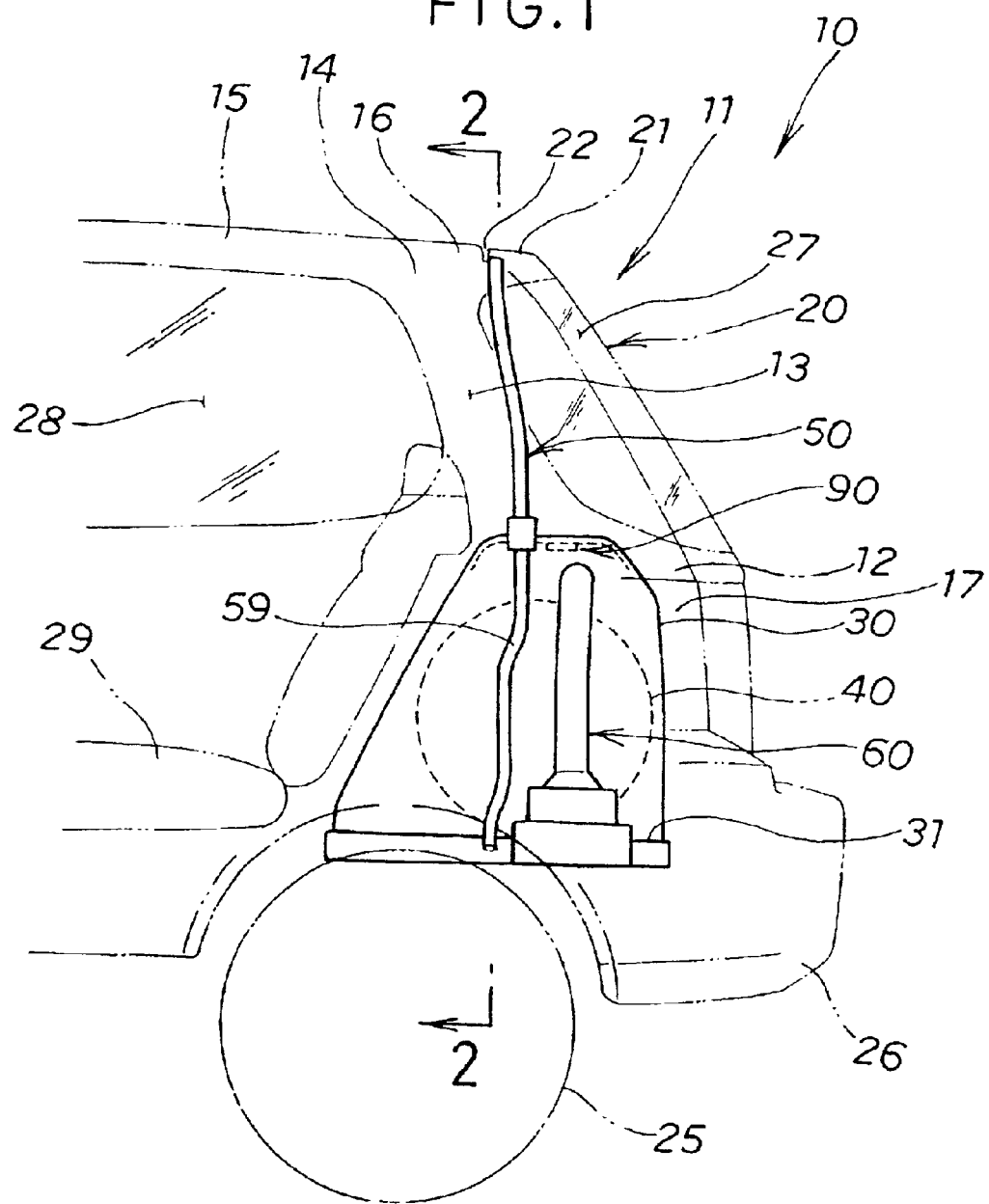
FIG. 1 is a side elevation view of a rear part of a gaseous fuel-powered automobile including a gaseous fuel discharging structure according to the present invention.

Referring to FIG. 1, a gaseous fuel-powered automobile 10 includes an automobile body 11 having rear pillars 13 (only one shown) positioned at a rear part 12 thereof. The rear pillars 13 have a roof 15 mounted at a top 14 thereof. The roof 15 has its rear end 16 disposed in opposed relation to an upper frame member 21 with a given interval (a gap 22 formed between the roof 15 and the tailgate 20) formed therebetween. A tailgate 20 is mounted at the rear part 12 in such a manner as to pivot in an up-and-down direction. The rear part 12 has a trunk 17 formed therein. An airtight or sealing cover 30 is disposed within the trunk 17 and on a bottom of the rear part 12 by means of a bracket 31. The cover 30 covers a gaseous fuel containing tank 40. The cover 30 is provided with a spontaneous ventilation structure 50 and a forced ventilation structure 60 (a gaseous fuel discharging structure). The spontaneous ventilation structure 50 is arranged such that gaseous fuel leaked from within the tank 40 spontaneously flows out of the automobile body 11. The forced discharge is arranged such that gaseous fuel leaked from within the tank 40 is forced to flow out of the automobile body 11.

Gaseous fuel the automobile 10 employs is natural gas or hydrogen gas, for example. The tank 40 as used herein is made of resin. It is noted that the tank 40 may be also formed of any material other than resin.

Reference numerals 25, 26, 27, 28, 29 denote a rear wheel, a rear bumper, a glass window mounted on the tailgate 20, a rear side glass window, and a rear seat, respectively.

Figure 2:
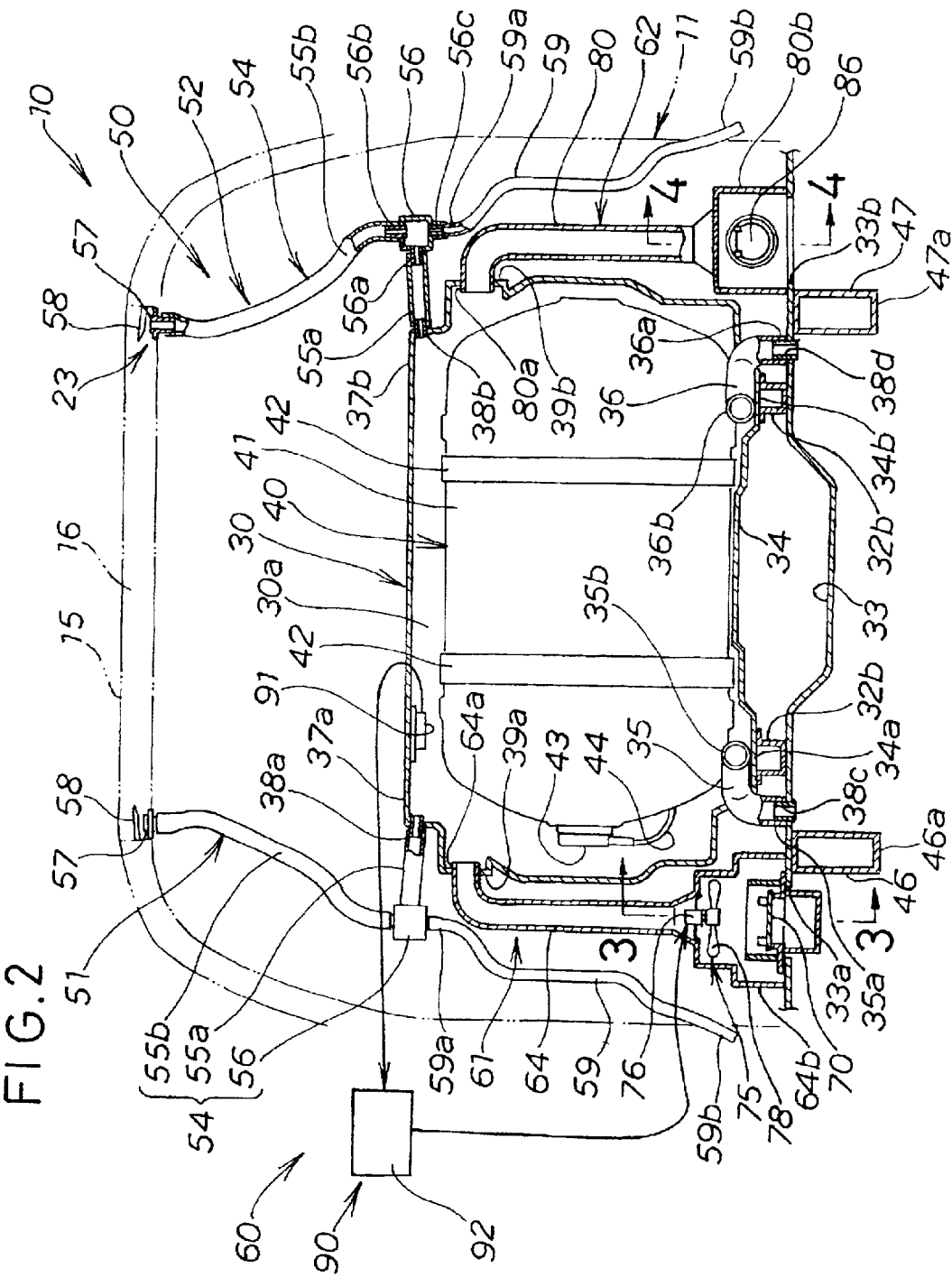
FIG. 2 is a cross-sectional view taken along line 2—2 of FIG. 1.

Turning to FIG. 2, the automobile body 11 includes a floor plate 33. Attached to an underside of the floor plate 33 are right and left side frames 47, 46 spaced from each other by a given interval.

The airtight cover 30 is mounted to the floor plate 33 via right and left channel portions 32b, 32a. The tank 40 is housed or encased in the cover 30. A bottom 34 of the cover 30 has right and left air introducing pipes 36, 35 mounted at right and left ends 34b, 34a thereof, respectively. The cover 30 has right and left communication pipes 38b, 38a provided at right and left top ends 37b, 37a thereof.

These communication pipes 38b, 38a are connected to the spontaneous ventilation structure 50.

The tank 40 has two bands 42, 42 wound thereon. By means of the bands 42, 42, the tank 40 is mounted to a support bracket (not shown) of the automobile body 11. A gas filling pipe 44 and a gas supply pipe (not shown) are connected to a left end 43 of the tank 40. The gas filling pipe 44 is used to fill the tank 40 with gaseous fuel whilst the gas supply pipe is used to supply an engine (not shown) with gaseous fuel contained within the tank 40.

The left air introducing pipe 35 has a communication pipe 38c connected to a lower end 35a thereof while the right air introducing pipe 36 has a communication pipe 38d connected to a lower end 36a thereof. The communication pipes 38c, 38d has their exits exposed to the open air. The communication pipes 38c, 38d have their opened upper ends 35b, 36b positioned within the cover 30. Air outside the automobile body 11 is introduced into the cover 30 through the pipe 35, 36.

The spontaneous ventilation structure 50 includes a left gas spontaneous discharger 51 provided to the left communication pipe 38a, and a right gas spontaneous discharger 52 provided to the right communication pipe 38b.

The right and left gas spontaneous dischargers 52, 51 are identical in structure with each other, and hence the description of the left gas spontaneous discharger 51 is omitted.

The right gas spontaneous discharger 52 includes a discharge pipe 54 for directing gaseous fuel, which leaked from within the tank 40, out of the automobile body 11. Positioned a given interval away from a discharge port 57 of the discharge pipe 54 is a water entry preventing member 58 for preventing water such as rainwater from entering into the discharge pipe 54. The discharge pipe 54 has an additional water drainage pipe 59 attached thereto. If water enters into the discharge pipe 54, the former flows through the water drainage pipe 59 out of the automobile body 11.

Providing the water entry preventing member 58 makes it possible to prevent rainwater and the like from entering into the discharge pipe 54 through the discharge port 57.

The discharge pipe 54 includes a first discharge pipe 55a connected to the right communication pipe 38b, a connection block 56 having a side communication pipe 56a connected to the first discharge pipe 55a, and a second discharge pipe 55b through which the discharge port 57 communicates with an upper communication pipe 56b of the connection block 56.

The discharge port 57 is positioned within a space 23 below the gap 22.

The second discharge pipe 55b is oriented substantially vertically to allow gaseous fuel leaked from within the tank 40 to spontaneously flow through the first discharge pipe 55a, the connection block 56, and the second discharge pipe 55b out of the automobile body 11.

The connection block 56 has its lower connection member 56c connected to an entrance 59a of the water drainage pipe 59. The water drainage pipe 59 extends downwardly and has an exit 59b positioned outside the automobile body 11. With this arrangement, even if water unfortunately enters the discharge pipe 54, the former is unlikely to remain within the discharge pipe 54.

The forced ventilation structure 60 includes an air introducer 61 for forcibly introducing air outside the automobile body 11 into the cover 30, a gas discharger 62 for discharging out of the automobile body 11 a mixture of gaseous fuel leaked from within the tank 40 and the air introduced through the air introducer 61 into the cover 30, and a gas detector 90 for detecting gaseous fuel which is leaked from within the tank 40 and remains within the cover 30.

The air introducer 61 includes an air introducing pipe 64. The pipe 64 has its top end (exit) 64a connected to an upper portion 39a of a left side wall of the airtight cover 30. A bottom end (entrance) 64b of the pipe 64 has a rubber-made intake flap 70 mounted therewithin. The flap 70 is pivotable between a closed position and an opened position. The bottom end 64b also has a fan 75 mounted therewithin. The fan 75 is positioned above the flap 70.

Operation of the fan 75 causes the flap 70 to pivot to the opened position in which air outside the automobile body 11 is taken into the cover 30.

The gas discharger 62 includes a gas discharging pipe 80. The pipe 80 has its top end (entrance) 80a connected to an upper portion 39b of a right side wall of the cover 30. A bottom end (exit) 80b of the pipe 80 has a rubber-made discharge flap 86 mounted therewithin. The discharge flap 86 is pivotable between a closed position and an opened position.

As the fan 75 of the air introducer 61 is operated to take air outside the automobile body 11 into the air introducer 61, the flap 86 is caused to pivot to the opened position as will be discussed in detail. With the flap 86 in the opened position, a mixture of the introduced air and the leaked gaseous fuel is allowed to flow out of the automobile body 11.

The entrance 64b and the exit 80b are provided at the floor plate 33. More specifically, the entrance 64b of the gas discharging pipe 80 is provided outside the left side frame 46 and above a lower surface 46a of the left side frame 46. Likewise, the exit 80b of the gas discharge pipe 80 is provided outside the right side frame 47 and above a lower surface 47a of the right side frame 47.

The side frames 46, 47 are positioned between the entrance 64b and the exit 80b. With this arrangement, it is unlikely that gaseous fuel discharged out of the exit 80b is drawn into the entrance 64b. It thus becomes possible to efficiently ventilate a hermetic or sealed space 30a defined within the airtight cover 30.

The gas detector 90 includes a gas sensor 91 attached to the left top end 37a of the cover 30, and a control unit 92 for driving the fan 75 on the basis of a signal sent from the gas sensor 91.

When an amount of gaseous fuel which is leaked from within the tank 40 and remains within the space 30a exceeds a threshold level, the gas sensor 91 is operated to detect the presence of such gaseous fuel and supply the control unit 92 with a detection signal indicative of the detection of the gaseous fuel. The control unit 92 sends a motor 76 of the fan 75 a drive signal for driving the motor 76. Upon receiving the drive signal, the motor 76 is driven to rotate blades 78 attached thereto.

When the amount of the gaseous fuel remaining within the cover 30a is made less than the threshold level, the gas sensor 91 stops its operation of detecting the gaseous fuel. In other words, the gas sensor 91 sends no detection signals to the control unit 92. Therefore, the fan 75 is supplied with no drive signals. The blades 78 consequently stop rotating.

The gas detector 90 as used herein is arranged such. that the control unit 92 controls the fan 75. The gas detector 90 may be applicable to a vehicle having an indication part and an operation button both provided proximate a driver's seat. In this case, when the gas sensor 91 detects the gaseous fuel having an amount greater than the threshold level, the indication part is lit up to thereby indicate to a driver that the gaseous fuel is leaked from within the tank 40. The driver pushes the operation button to thereby drive the motor 76 of the fan 75 in the manner as stated above.

Figure 3:
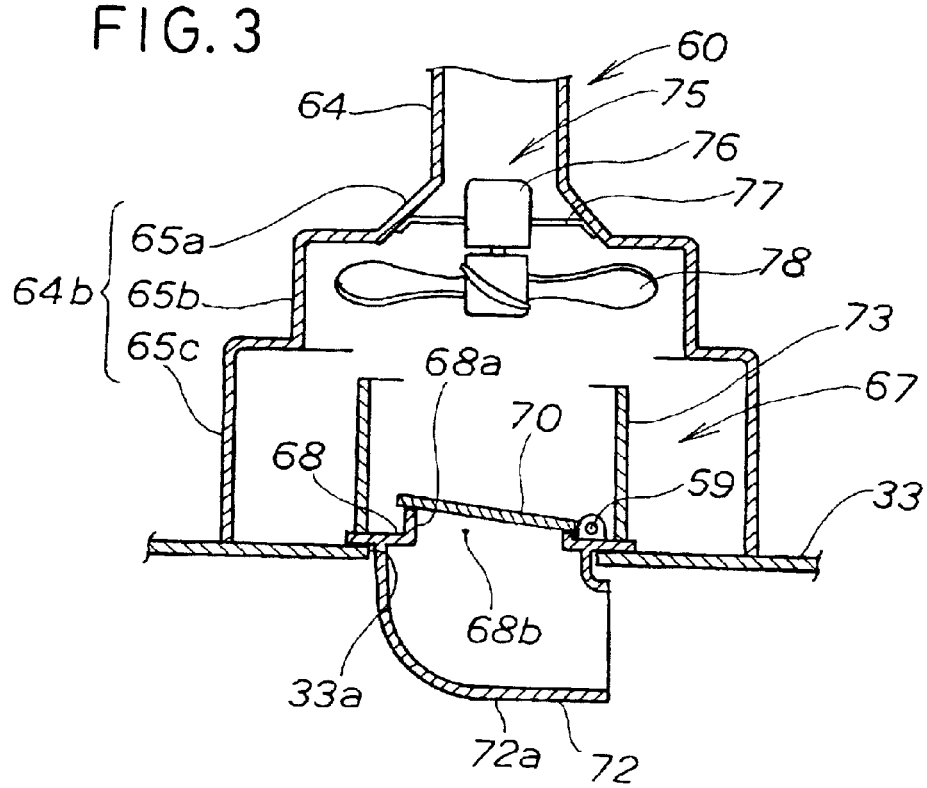
FIG. 3 is a cross-sectional view taken along line 3—3 of FIG. 2.

With respect to FIG. 3, the entrance 64b includes a taper portion 65a, a first enlarged pipe portion 65b communicating with the taper portion 65a, and a second enlarged pipe portion 65c communicating with the first enlarged pipe portion 65b. The second enlarged pipe portion 65c is mounted to the floor plate 33.

The entrance 64b provided above the floor plate 33 is difficult to view from outside the automobile body 11 to thereby provide a pleasant appearance of the automobile body 11.

Within the second enlarged pipe portion 65c, there is formed an intake portion 67 having a flange 68 mounted at a left opening portion 33a of the floor plate 33. The flap 70 is mounted on the flange 68 in such a manner as to pivot on a pin 59.

The intake flap 70 has the pin 59 provided rightwardly thereof. This arrangement is advantageous in that as the fan 75 is out of operation, the flap 70 remains horizontally oriented abutting on a projection portion 68a under its own weight to thereby keep an opening 68b closed. As the fan 75 is operated, the flap 70 is pivoted clockwise under a wind pressure produced by the operation of the fan 75 to thereby open the opening 68b.

The flap 70 as used herein is pivotable on the pin 59. Utilizing the flexibility of the rubber-made flap 70, however, the flap 70 may be mounted to the flange 68 without using the pin 59. In such a case, as the fan 75 is operated, the flap 70 can be bent or flexed upwardly under a wind pressure produced by the operation of the fan 75 to thereby open the opening 68b. As the fan 75 is out of operation, the flap 70 remained oriented horizontally, abutting on the projection portion 68a under its own weight to thereby keep the opening 68b closed, as discussed above.

Beneath the flange 68, there is formed an intake pipe 72 bent into a substantially L-shaped configuration. The intake pipe 72 extends backwardly and is positioned outside the automobile body 11. Mounted on the flange 68 is a guide cylinder 73 extending towards the fan 75.

The motor 76 is mounted via plural stays 77 to the taper portion 65a. The blades 78 are rotationally positioned within the first enlarged pipe portion 65b.

As the flap 70 is kept closed under its own weight, the air introducing pipe 64 is usually closed. With the pipe 64 closed, noise is prevented from being transmitted through the pipe 64 into a passenger compartment of the automobile 10. In addition, it becomes possible to prevent unwanted foreign materials such as water and dust from entering into the pipe 64.

The intake flap 70 is protected by a lower wall surface 72a of the L-shaped intake pipe 72. More specifically, the lower wall surface 72a serves to prevent foreign materials over a road from entering into the intake pipe 72 and striking the flap 70. The intake flap 70 is thus no longer damaged.

Figure 4:
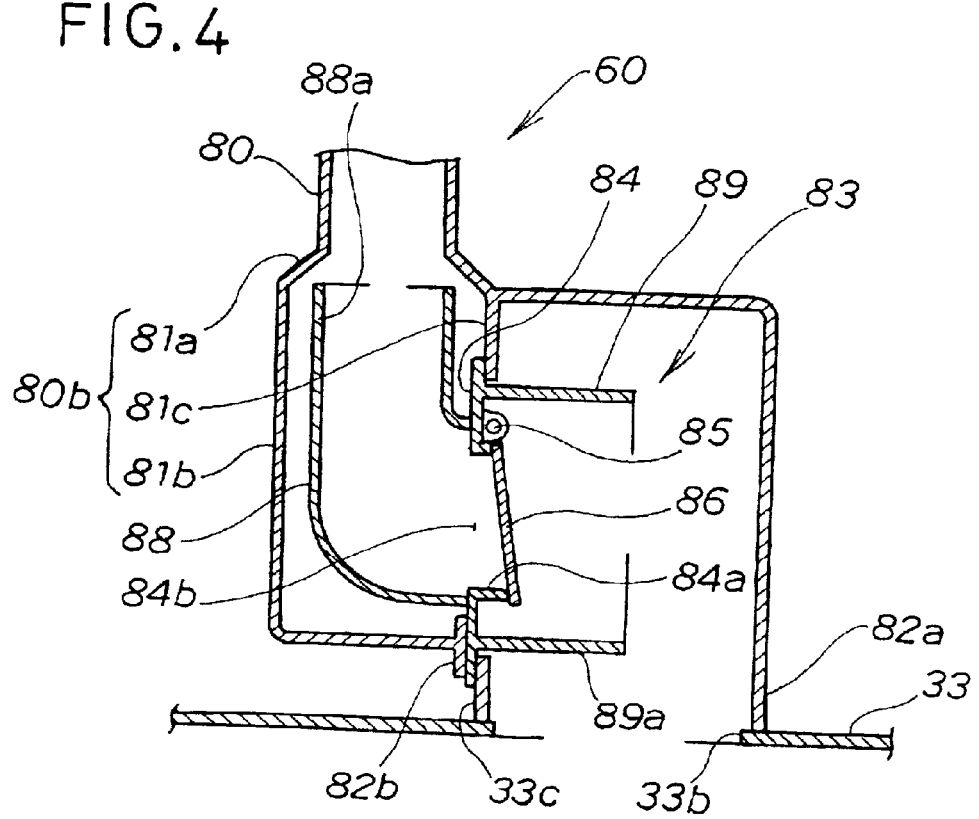
FIG. 4 is a cross-sectional view taken along line 4—4 of FIG. 2.

Referring to FIG. 4, an exit 80b of the gas discharging pipe 80 includes a taper portion 81a, and an enlarged pipe portion 81b communicating with the taper portion 81a. The enlarged pipe portion 81b has a mounting wall 81c extending inwardly therefrom. The mounting wall 81c is directed perpendicularly to the enlarged pipe portion 81b.

The enlarged pipe portion 81b has one lower end 82a mounted on the floor plate 33. Another end 82b of the enlarged pipe portion 81b is attached to a flange 84 of a discharge part 83. The flange 84 is attached to a mounting wall 33c mounted on the floor plate 33. The enlarged pipe portion 81b communicates with a right opening portion 33b of the floor plate 33. The right opening portion 33b communicates with the outside of the automobile body 11.

Because the exit 80b is provided above the floor plate 33, the former is difficult to view from outside the automobile body 11 to thereby provide a pleasant appearance of the automobile 10.

The discharge part 83 is disposed within the enlarged pipe portion 81b. The flange 84 of the discharge part 83 is mounted to the mounting walls 33c, 81c. A discharge flap 86 is mounted to the flange 84 in such a manner as to pivot on a pin 85.

The pin 85 is positioned at a higher level than the discharge flap 86. This arrangement provides the advantage that as the fan 75 is out of operation, the flap 86 usually remains oriented substantially vertically under its own weight, abutting on a projection portion 84a of the flange 84 to thereby keep an opening 84b closed. As the fan 75 is operated, the flap 86 can be pivoted counterclockwise to open the opening 84b, as will be discussed later in detail.

The discharge part 83 has a substantially L-shaped guide cylinder 88 positioned forwardly of the flange 84. The guide cylinder 88 has its entrance 88a oriented towards the gas discharging pipe 80. A discharge port portion 89 extends backwardly from the flange 84.

In the illustrated embodiment, the flap 86 is pivotable on the pin 85. Utilizing the flexibility of the rubber-made flap 86, however, the flap 86 may be mounted to the flange 84 without using the pin 85. In such a case, the flap 86 is bent or flexed rightwardly to open the opening 84b. It is to be understood that as the fan 75 is out of operation, the flap 86 mounted to the flange 84 without using the pin 85 also is usually oriented substantially vertically, abutting on the projection portion 84a under it own weight to thereby keep the opening 84b closed.

Since the flap 86 usually closes the opening 84b, noise is prevented from passing through the gas discharging pipe 80 into the passenger compartment of the automobile 10. Moreover, foreign materials such as water and dust no longer enter into the pipe 80.

A lower wall surface 89a of the horizontally extending discharge port portion 89 is provided for protecting the discharge flap 86 from undesirable foreign materials over the road. More specifically, such foreign materials are prevented from striking the flap 86. The flap 86 can not be damaged, accordingly.

Reference is made to FIG. 5A illustrating the spontaneous ventilation structure 50 with the forced ventilation structure omitted for explanatory purpose.

If gaseous fuel is leaked out of a connection point at which the gas filling pipe 44 and the gas supply pipe (not shown) are connected to the tank 40, the former remains within the space 30a.

Air outside the automobile body 11 is introduced into the space 30a through the air introducing pipes 35, 36, as shown by arrows ①, ①.

At this point, the amount of gaseous fuel thus remaining within the space 30a does not yet exceed the threshold level, and therefore the intake flap 70 is held in the closed position as shown in FIG. 3.

The gaseous fuel within the space 30a spontaneously enters into the second discharge pipes 55b, 55b via the first discharge pipes 55a, 55a and the connection blocks 56, 56, as indicated by arrows ②, ②, ③, ③.

The gaseous fuel flows out of the discharge ports 57, 57, as shown by arrows ④, ④, after smoothly passing through the second discharge pipes 55b, 55b extending upwardly to the roof 15.

With respect to FIG. 5B, the water drainage pipes 59, 59 are mounted to the connection blocks 56, 56. If water unfortunately flows from outside the roof 15 into the discharge pipes 54, 54, as shown by arrows ⑤, ⑤, the water passes downwardly into the water drainage pipes 59, 59 out of the exits 59b, 59b, as indicated by arrows ⑥, ⑥, ⑦, ⑦.

No water thus remains within the discharge pipes 54, 54. This leads to increased life of the discharge pipes 54, 54.

Discussion will be made as to how the forced ventilation structure 60 is operated in accordance with the present invention.

The spontaneous ventilation structure 50 is not suitable for advantageously discharging great amount of gaseous fuel leaked from the connection point.

Figure 6A:
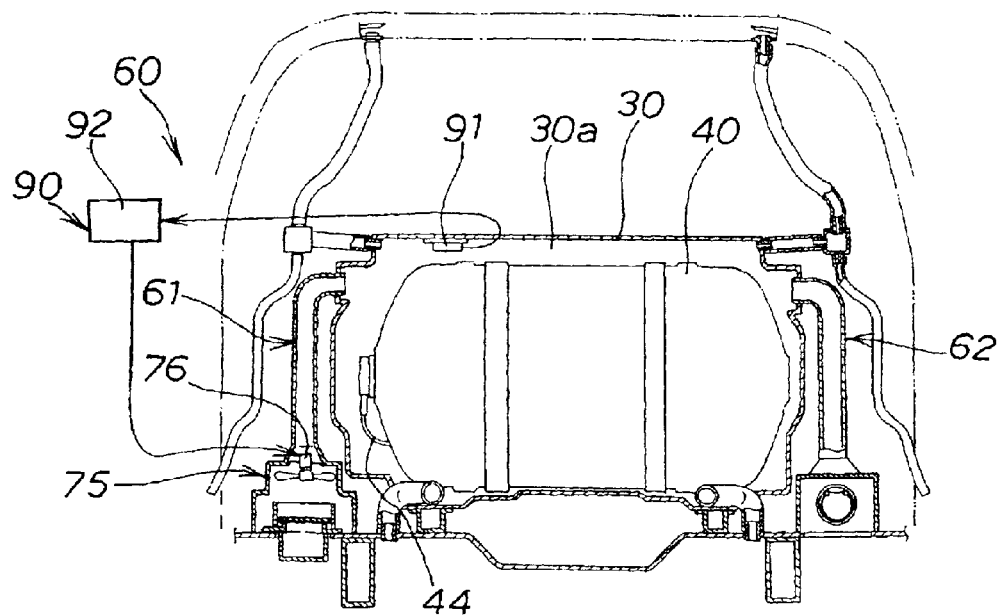
FIG. 6A is a view showing how a forced ventilation structure is operated when gaseous fuel is leaked in large amount from within the tank and FIG. 6B is a view showing how the forced ventilation structure draws air from outside the automobile thereinto.

In relation to FIG. 6A, if gaseous fuel remaining within the space 30a after leaking from the connection point has an amount exceeding the threshold level, the gas sensor 91 detects such gaseous fuel. The gas sensor 91 sends the control unit 92 a detection signal indicative of the detection of the gaseous fuel. The control unit 92 transmits to the motor 76 of the fan 75 a drive signal for driving the motor 76.

Figure 6B:
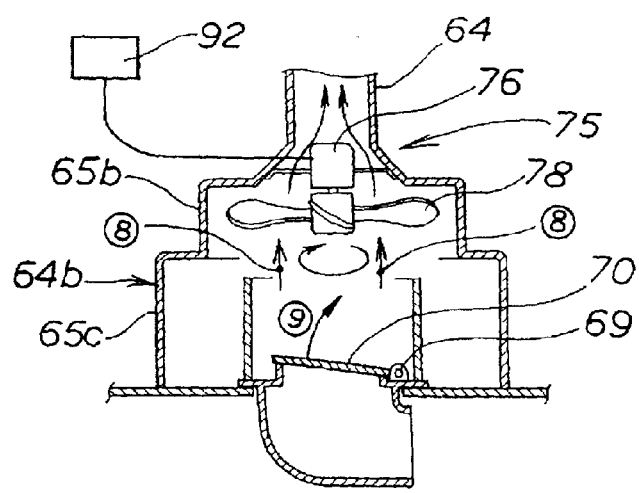

Referring to FIG. 6B, upon receiving the drive signal, the motor 76 is driven to thereby rotate the blades 78, as shown an arrow. Rotation of the blades 78 causes air within the first and second enlarged pipe portions 65b, 65c to be directed into the air introducing pipe 64, as shown by arrows ⑧, ⑧.

This causes the flap 70 to pivot clockwise from the closed position towards the opened position, as shown by an arrow ⑨.

Figure 7A:
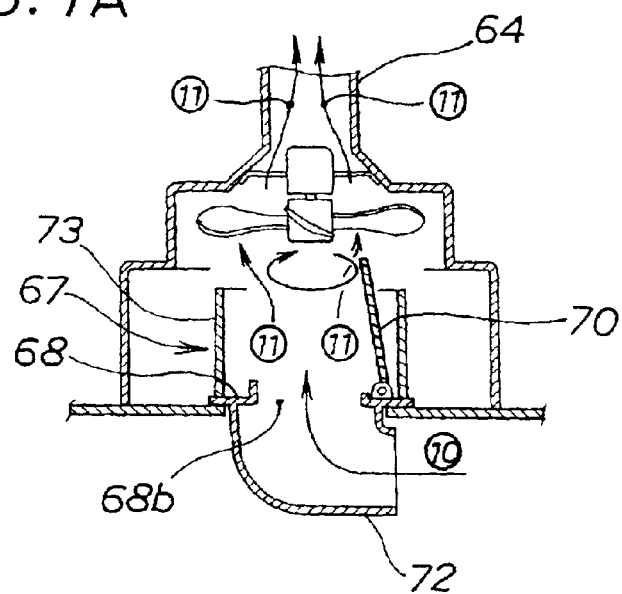
FIG. 7A is a view illustrating the flow of the air into the forced ventilation structure and FIG. 7B is a view showing the flow of mixture of the air and the gaseous fuel through the forced ventilation structure.

Turning to FIG. 7A, since the flap 70 is in the opened position, the opening 68b is opened. Air outside the automobile body 11 is drawn into the guide cylinder 73 via the intake pipe 72 of the intake portion 67, as indicated by an arrow ⑩. The air is then taken into the air introducing pipe 64, as shown by arrows ⑪, ⑪, ⑪, ⑪.

Figure 7B:
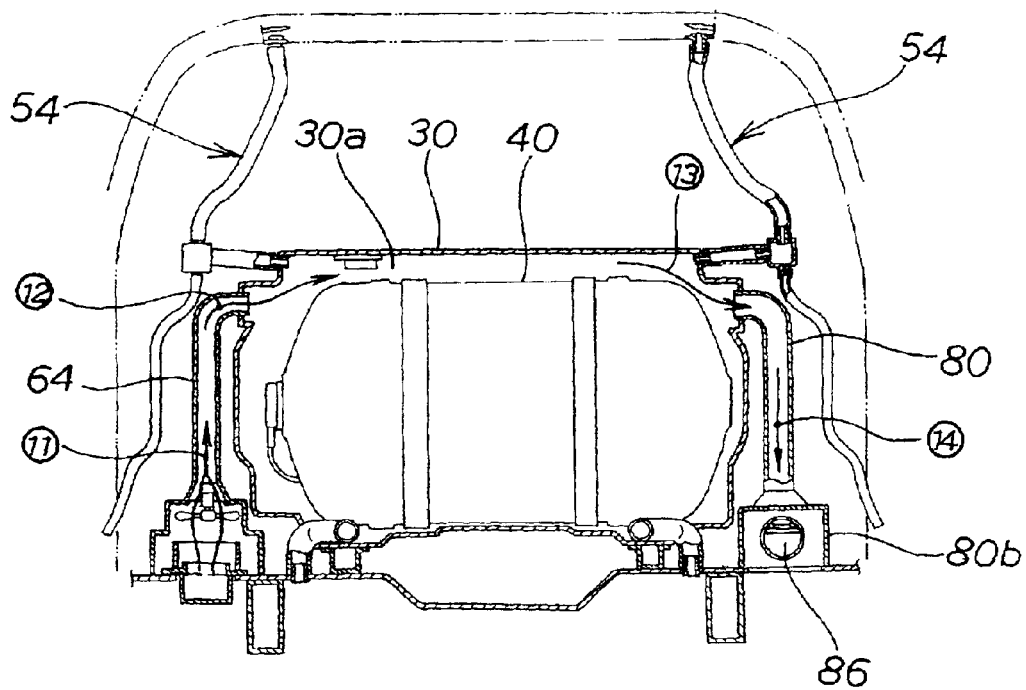

Referring to FIG. 7B, after passing through the pipe 64, the air flows into the space 30a to thereby mix with the gaseous fuel which has leaked from the connection point, as indicated by an arrow ⑫.

A mixture of the air and the gaseous fuel passes through the space 30a into the gas discharging pipe 80, as indicated by an arrow ⑬. The mixture flows through the pipe 80, as shown by an arrow ⑭.

The mixture is in part discharged out of the discharge pipes 54, 54. Because the discharge pipes 54, 54 are smaller in diameter than the gas discharging pipe 80, however, most of the mixture flows into the pipe 80.

Figure 8A:
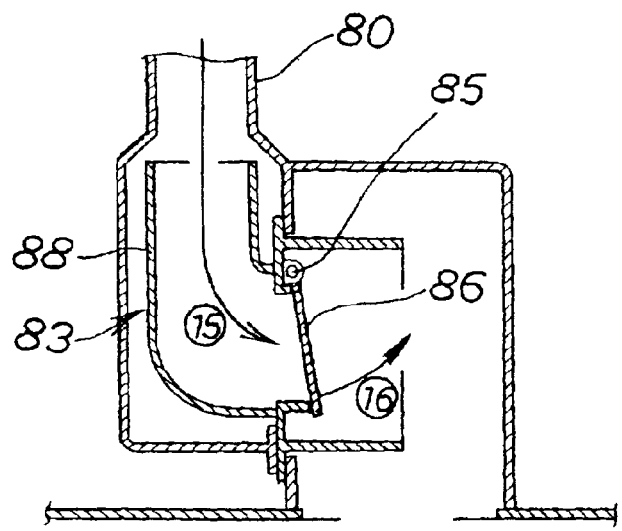
FIGS. 8A and 8B are views illustrating the flow of the. mixture out of the forced ventilation structure.
Figure 8B:
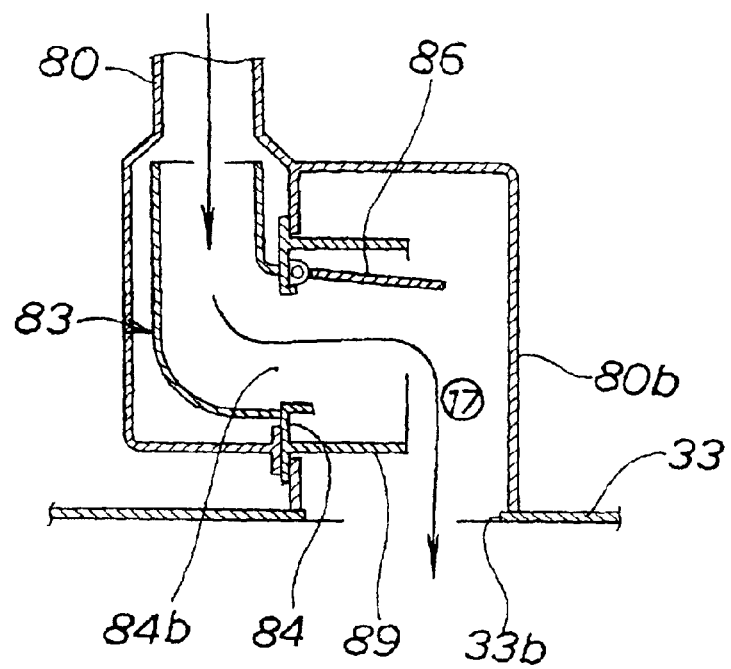

With respect to FIG. 8A, the mixture passes through the pipe 80 into the guide cylinder 88, as shown by an arrow ⑮, to thereby exert a wind pressure on the discharge flap 86. The flap 86 is thereby caused to pivot counterclockwise from the closed position to the opened position, as indicated by an arrow ⑯.

The counterclockwise pivotal movement of the flap 86 opens the opening 84b. After passing through the opening 84b, the mixture flows through the discharge port portion 89 and the exit 80b out of the right opening portion 33b, as shown by an arrow ⑰.

Figure 9:
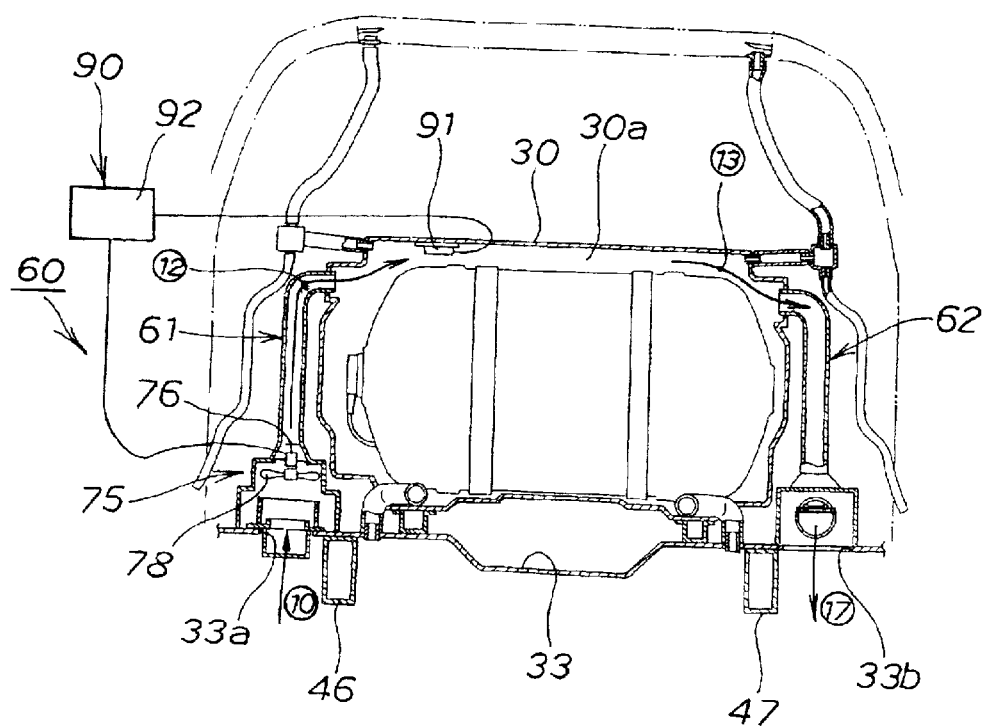
FIG. 9 is a view showing how the forced ventilation structure discharges the gaseous fuel out of the automobile.

Reference is made to FIG. 9. It thus becomes possible to discharge the mixture out of the automobile body 11, as indicated by the arrow ⑰. By thus driving the fan 75, air outside the automobile body 11 is drawn or taken into the space 30a as shown by the arrows ⑩, ⑫ and mixes with the gaseous fuel to thereby provide the mixture. The mixture is therefore directed out of the automobile body 11, as shown by the arrows ⑬, ⑰.

By thus driving the fan 75, the gaseous fuel within the space 30a is forced to flow out of the automobile body 11 with efficiency.

The forced ventilation structure 60 thus arranged to force the gaseous fuel out of the automobile body 11 can be advantageously used in a fuel-cell-powered automobile employing hydrogen gas as gaseous fuel. It is to be understood that the forced ventilation structure may be used for advantageously discharging any gaseous fuel other than those described above.

By thus discharging most the gaseous fuel out of the automobile body 11, the gaseous fuel remaining within the space 30a decreases in amount to below the threshold level. The gas sensor 91 then ceases to detect the gaseous fuel within the space 30a. Thus, the control unit 92 is not supplied with any detection signal. Neither is the motor supplied with any drive signal, accordingly. The rotation of the blades 78 stops.

Thereafter, the intake flap 70 is returned to the closed position under its own weight to thereby close the opening 68b as shown in FIG. 3. Likewise, the discharge flap 86 is pivoted back to the closed position under its own weight to thereby close the opening 84b as shown in FIG. 4. It therefore becomes possible to prevent noise from being transmitted into the passenger compartment of the automobile 10. Further, it becomes possible to prevent unwanted foreign materials from entering into the air introducing pipe 64 and the gas discharging pipe 80.

The gaseous fuel discharging structure in the illustrated embodiment has been described as being used for discharging the gaseous fuel leaked from the connection point, however, it may be altered in such a manner as to discharge gaseous fuel leaked from within the tank body 41.

Material from which the flaps 70, 86 are made is not limited to rubber but includes other materials such as resin.

The fan 75 may be provided to the gas discharging pipe 80 rather than to the air introducing pipe 64. Furthermore, it is contemplated that both the air introducing pipe 64 and the gas discharging pipe 80 are provided with the fans 75, 75.

The present disclosure relates to the subject matter of Japanese Patent Application No. 2001-008313, filed Jan. 16, 2001, the disclosure of which is expressly incorporated herein by reference in its entirety.

What is claimed is:

1. A gaseous fuel discharging structure for a vehicle having a trunk and a gaseous fuel containing tank disposed in a hermetic space defined within the trunk, said gaseous fuel discharging structure comprising:
    an air introducing pipe communicating with said hermetic space and extending to outside of the vehicle;
    a gas discharging pipe communicating with said hermetic space and extending to the outside of the vehicle;
    forced ventilation means disposed on at least one of said air introducing pipe and said gas discharging pipe for forcedly ventilating said hermetic space; and
    an opening/closing device disposed on each of said air introducing pipe and said gas discharging pipe,
    said opening/closing devices being held at a closed position to seal said air introducing pipe and said gas discharging pipe when said forced ventilation means is out of operation and, when said forced ventilation means is in operation, pivoted to an opened position so that any gaseous fuel leaked from said gaseous fuel containing tank into said hermetic space is forced out of the vehicle through said gas discharging pipe by fresh air flowing through said air introducing pipe into said hermetic space.

2. A gaseous fuel discharging structure for a vehicle, according to claim 1, wherein said hermetic space is defined by a sealing cover hermetically enclosing said gaseous fuel containing tank,
    said air introducing pipe and said gas discharging pipe extending outwardly of the vehicle from said sealing cover, said forced ventilation means comprises a fan to be actuated upon leakage of the gaseous fuel, and said opening/closing devices comprises flaps to be pivoted to the opened position by the flow of air produced by said fan.

3. A gaseous fuel discharging structure for a vehicle, according to claim 1, further comprising a floor plate provided for carrying an entrance of said air introducing pipe and an exit of said gas discharging pipe thereon, said floor plate having right and left side frames mounted thereon, one of said entrance and said exit being positioned outwardly of said left side frame, the other of said entrance a and said exit being positioned outwardly of said right side frame.

* * * * *